(12) United States Patent
Mann

(10) Patent No.: US 9,992,131 B2
(45) Date of Patent: Jun. 5, 2018

(54) DIAMETER ROUTING AGENT LOAD BALANCING

(71) Applicant: ALCATEL LUCENT CANADA, INC., Ottawa (CA)

(72) Inventor: Robert A. Mann, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1053 days.

(21) Appl. No.: 13/892,672

(22) Filed: May 13, 2013

(65) Prior Publication Data

US 2013/0322430 A1 Dec. 5, 2013

Related U.S. Application Data

(63) Continuation-in-part of application No. 13/482,690, filed on May 29, 2012, and a continuation-in-part of application No. 13/482,587, filed on May 29, 2012, now Pat. No. 8,804,931, and a continuation-in-part of application No. 13/602,579, filed on Sep. 4, 2012, now Pat. No. 8,850,064.

(51) Int. Cl.
*H04L 12/911* (2013.01)
*H04L 29/08* (2006.01)

(52) U.S. Cl.
CPC ........ *H04L 47/726* (2013.01); *H04L 67/1017* (2013.01)

(58) Field of Classification Search
CPC ..................................................... H04L 47/726
USPC .......................................................... 718/105
See application file for complete search history.

(56) References Cited

U.S. PATENT DOCUMENTS

| | | | | |
|---|---|---|---|---|
| 6,813,635 | B1 * | 11/2004 | Jorgenson | 709/225 |
| 2005/0071455 | A1 * | 3/2005 | Collins | 709/223 |
| 2009/0080440 | A1 * | 3/2009 | Balyan et al. | 370/400 |
| 2010/0299451 | A1 * | 11/2010 | Yigang et al. | 709/241 |
| 2011/0026460 | A1 * | 2/2011 | Lafuente Alvarez et al. | 370/328 |
| 2011/0202676 | A1 * | 8/2011 | Craig et al. | 709/238 |
| 2012/0173711 | A1 * | 7/2012 | Bollapalli et al. | 709/224 |
| 2012/0225679 | A1 * | 9/2012 | McCann et al. | 455/466 |

* cited by examiner

*Primary Examiner* — Nicholas Taylor
*Assistant Examiner* — Sanjoy Roy
(74) *Attorney, Agent, or Firm* — Kramer & Amado, P.C.

(57) ABSTRACT

Various exemplary embodiments relate to a method and related network node including one or more of the following: receiving a Diameter message at the DRA from an origin device; encountering an instruction to perform load balancing; locating an applicable load balancing pool of a plurality of load balancing pools for the Diameter message; identifying a pool host from the applicable load balancing pool to receive the Diameter message; modifying a destination address of the Diameter message to include an address of the identified pool host; and transmitting the Diameter message based on the modified destination address.

20 Claims, 7 Drawing Sheets

FIG. 6

| | 605 | 610 | 615 | 620 | 625 | 630 |
|---|---|---|---|---|---|---|
| | Name | Description | Destination Realms | Applications | Balancing Algorithm | Hosts |
| 640 | US LBP1 | Pool for US LTE Requests | US_Public_Realm | Gx, Gxx, Rx | Round Robin | {H1, H2, H3, H4} |
| 650 | US LBP2 | Pool for all other US Requests | US_Public_Realm | * | Round Robin | {H2, H5, H6} |
| 660 | France Pool | All French Requests | * | * | Weighted | {R1} |
| 670 | Germany Pool | All German Requests | * | * | Weighted | {R2, R3} |
| 680 | ... | ... | ... | ... | ... | ... |

| | 705 | 710 | 715 | 720 | 725 |
|---|---|---|---|---|---|
| | Pool Host Name | Administrative State | Host | Realm | Weight |
| 730 | H1 | Enabled | Host A | US Private Realm 1 | 5 |
| 735 | H2 | Disabled | Host B | US Private Realm 1 | 20 |
| 740 | H3 | Enabled | Host A | US Private Realm 2 | 10 |
| 745 | H4 | Enabled | Host B | US Private Realm 2 | 5 |
| 750 | H5 | Enabled | Host C | US Private Realm 2 | 5 |
| 755 | H6 | Enabled | Host C | US Private Realm 1 | 5 |
| 760 | R1 | Enabled | null | France Private Realm | 1 |
| 765 | R2 | Enabled | null | Germany Private Realm 1 | 2 |
| 770 | R3 | Enabled | null | Germany Private Realm 2 | 3 |
| 775 | ... | ... | ... | ... | ... |

700

DIAMETER ROUTING AGENT LOAD BALANCING

CROSS-REFERENCE TO RELATED APPLICATIONS

This application is a continuation-in-part the following co-pending applications, which are hereby incorporated by reference for as purposes as if fully set forth herein: application Ser. No. 13/482,690, filed on May 29, 2012, "ORGANIZATION OF DIAMETER ROUTING AGENT RULE SETS;" application Ser. No. 13/482,587, filed on May 29, 2012, "ROUTING DECISION CONTEXT OBJECTS;" application Ser. No. 13/602,579, filed on Sep. 4, 2012, "RULE ENGINE EVALUATION OF CONTEXT OBJECTS."

TECHNICAL FIELD

Various exemplary embodiments disclosed herein relate generally to communications networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAB) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a Diameter Routing Agent (DRA) for processing a Diameter message, the method including: receiving a Diameter message at the DRA from an origin device; locating, based on an instruction to perform load balancing, an applicable load balancing pool of a plurality of load balancing pools for the Diameter message; identifying a pool host from the applicable load balancing pool to receive the Diameter message; modifying a destination address of the Diameter message to include an address of the identified pool host; and transmitting the Diameter message based on the modified destination address.

Various embodiments described herein relate to a Diameter Routing Agent (DRA) for processing a Diameter message, the DRA including: a rule storage configured to store a rule that includes an instruction to perform load balancing; a Diameter stack configured to receive a Diameter message; a rule engine configured to: evaluate the rule, locate, based on the instruction to perform load balancing, an applicable load balancing pool of a plurality of load balancing pools for the Diameter message, identify a pool host from the applicable load balancing pool to receive the Diameter message, and modify a destination address of the Diameter message to include an address of the identified pool host; and a message handler configured to transmit, via the Diameter stack, the Diameter message based on the modified destination address.

Various embodiments described herein relate to a non-transitory machine-readable storage medium encoded with instructions for execution by a Diameter Routing Agent (DRA) for processing a Diameter message, the medium including: instructions for receiving a Diameter message at the DRA from an origin device; instructions for locating, based on an instruction to perform load balancing, an applicable load balancing pool of a plurality of load balancing pools for the Diameter message; instructions for identifying a pool host from the applicable load balancing pool to receive the Diameter message; instructions for modifying a destination address of the Diameter message to include an address of the identified pool host; and instructions for transmitting the Diameter message based on the modified destination address.

Various embodiments are described wherein: the instruction to perform load balancing includes a name of a load balancing pool; and locating an applicable load balancing pool includes locating a load balancing pool associated with the name.

Various embodiments are described wherein: the plurality of load balancing pools are associated with respective values for a destination realm attribute and respective values for an application attribute; and locating an applicable load balancing pool includes: identifying a destination realm and an application associated with the Diameter request; and locating a load balancing pool having values for the destination realm attribute and the application attribute that most closely matches the destination realm and the application associated with the Diameter request.

Various embodiments are described wherein: a first load balancing pool of the plurality of load balancing pools is associated with: a value for the destination realm attribute that exactly matches the destination realm of the Diameter request, and a value for the application attribute that exactly matches the application of the Diameter request; a second load balancing pool of the plurality of load balancing pools is associated with: a value for the destination realm attribute that includes the destination realm of the Diameter request and at least one additional destination realm, and a value for the application attribute that exactly matches the application of the Diameter request; a third load balancing pool of the plurality of load balancing pools is associated with: a value for the destination realm attribute that exactly matches the destination realm of the Diameter request, and a value for the application attribute that includes the application of the Diameter request and at least one additional application; and locating a load balancing pool includes determining that the first load balancing pool more closely matches the Diameter request than the second load balancing pool and the third load balancing pool.

Various embodiments are described wherein: the applicable load balancing pool identifies a balancing algorithm and a plurality of pool hosts; and identifying a pool host from the applicable load balancing pool to receive the Diameter message includes: determining the balancing algorithm identified by the load balancing pool, and applying the balancing algorithm to the plurality of pool hosts to identify the pool host.

Various embodiments are described wherein applying the balancing algorithm utilizes a plurality of weights respectively associated with the plurality of pool hosts.

Various embodiments are described wherein the destination address of the identified pool host includes a value for a destination realm attribute and a nonvalue for a destination host attribute.

Various embodiments additionally include evaluating a rule of a plurality of externalized rules, wherein the rule includes the instruction to perform load balancing.

BRIEF DESCRIPTION OF THE DRAWINGS

In order to better understand various exemplary embodiments, reference is made to the accompanying drawings, wherein:

FIG. 6 illustrates an exemplary data arrangement for storing load balancing pools;

FIG. 7 illustrates an exemplary data arrangement for storing pool host definitions;

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAB) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior. For example, it would be desirable to allow a user to define rules and configurations for performing load balancing at a DRA with respect to received Diameter messages.

Figure 1:
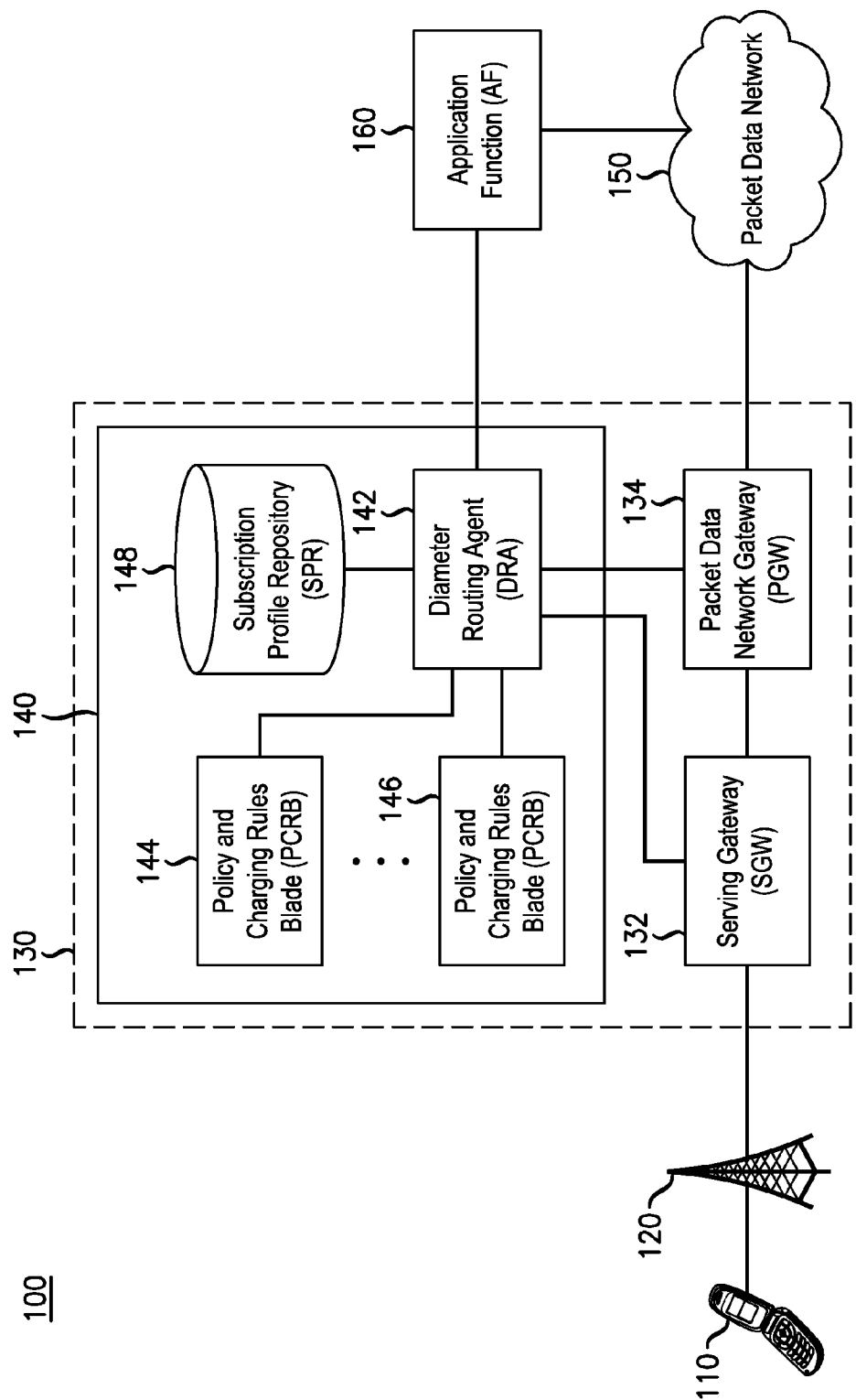
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository 148.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100. In various embodiments, the DRA 142 may provide similar support to applications defined according to other protocols. For example, the DRA 142 may additionally provide support for RADIUS or SS7 applications. Various modifications to the techniques and components described herein for supporting such other protocols will be apparent.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
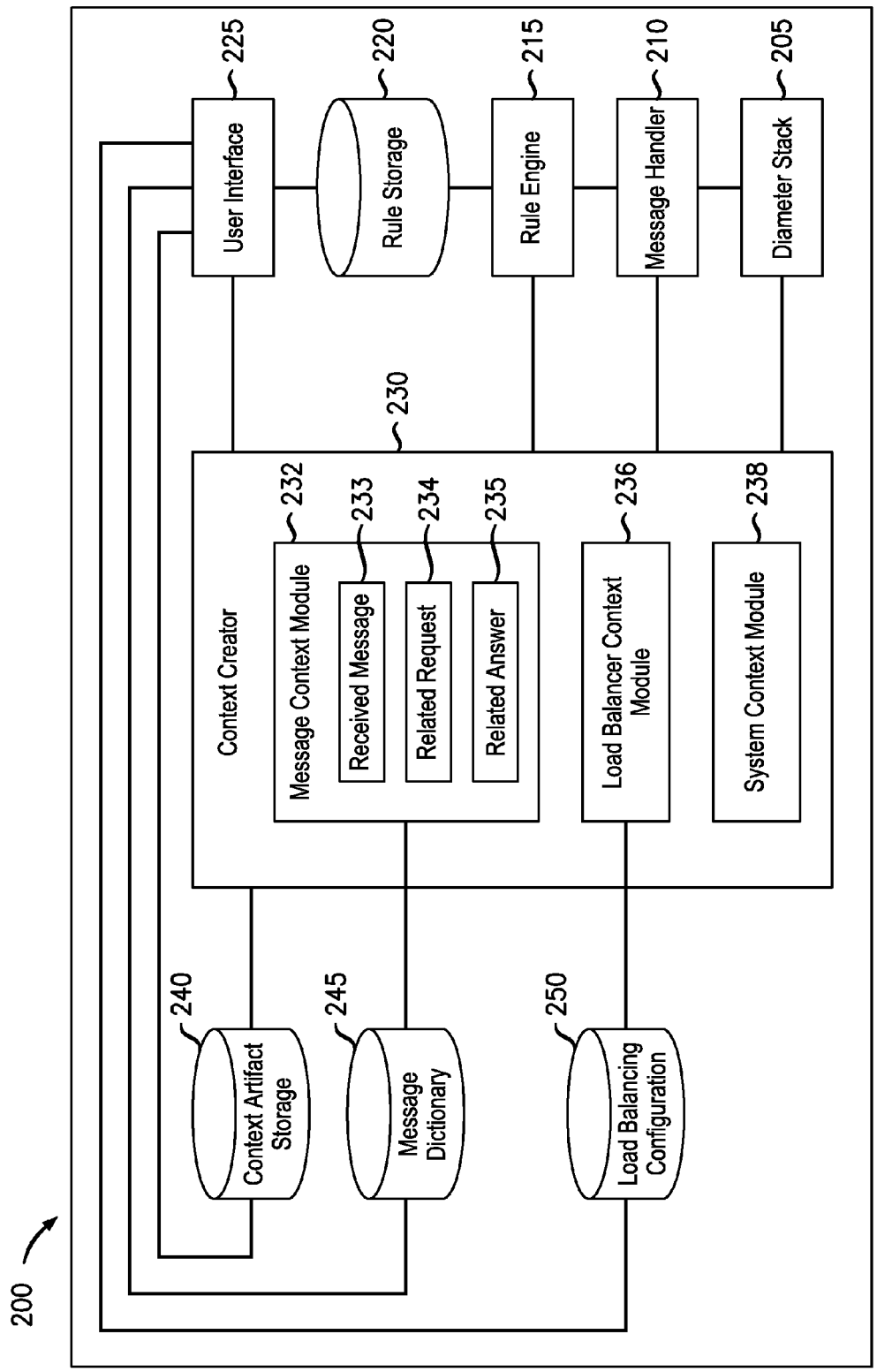
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, or load balancing configuration storage 250.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more results of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a load balancer context, or a system context. These context artifacts may be used by context creator 230 at run-time to instantiate different types of context objects. As such, context creator 230 may be viewed as including a message context module 232, a load balancer context module 236, and a system context module 238. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an Rx RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As an example, the load balancer context module 236 may be configured to instantiate a load balancer context object. Such a load balancer context object may provide functionality to identify, from a pool of hosts and according to some load balancing algorithm, what downstream host should process the received Diameter message. Upon identifying the downstream host, the load balancer context object may modify the destination realm or destination host of the received Diameter message to reflect the address of the identified downstream host.

In performing these functions, the load balancer context object may rely on configuration information stored in the load balancing configuration storage 250. For example, the load balancer context object may draw downstream hosts from different load balancing pools based on the received message and/or the rule being executed. These load balancing pools and their constituent pool hosts may be stored in the load balancing configuration storage 250. The load balancing configuration storage 250 may be any machine-readable medium capable of storing such configuration information such as, as will be described in greater detail below, load balancing pool and pool host definitions. Accordingly, the load balancing configuration storage 250 may include a machine-readable storage medium such as read-only memory (ROM), random-access memory (RAM), magnetic disk storage media, optical storage media, flash-memory devices, and/or similar storage media. In various embodiments, the load balancing configuration storage 250 may utilize the same physical storage device utilized by the rules storage 220, context artifact storage 240, or message dictionary 245.

As another example of a computational context, the system context module 238 may generate a system context object. The system context object may provide access to various system level functionality. For example, the system context object may provide access to routing information stored in the Diameter stack 205, enable event logging, or enable administrator messaging via dialogs or email. Various alternative or additional system functionality to expose via the system context object will be apparent.

In various alternative embodiments, the context creator 230 may not instantiate a dedicated load balancer context. Instead, the functionality described herein with respect to the load balancer context may be implemented as part of another context. For example, the attributes and actions described herein as being associated with the load balancer context may be implemented as part of the received message context or the system context.

It should be noted that while rule storage 220, context artifact storage 240, message dictionary 245, and load balancing configuration storage 250 are illustrated as separate devices, one or more of these components may be resident on multiple storage devices. Further, one or more of these components may share a storage device. For example, rule storage 220, context artifact storage 240, message dictionary 245, and load balancing configuration storage 250 may all refer to portions of the same hard disk or flash memory device.

Figure 3:
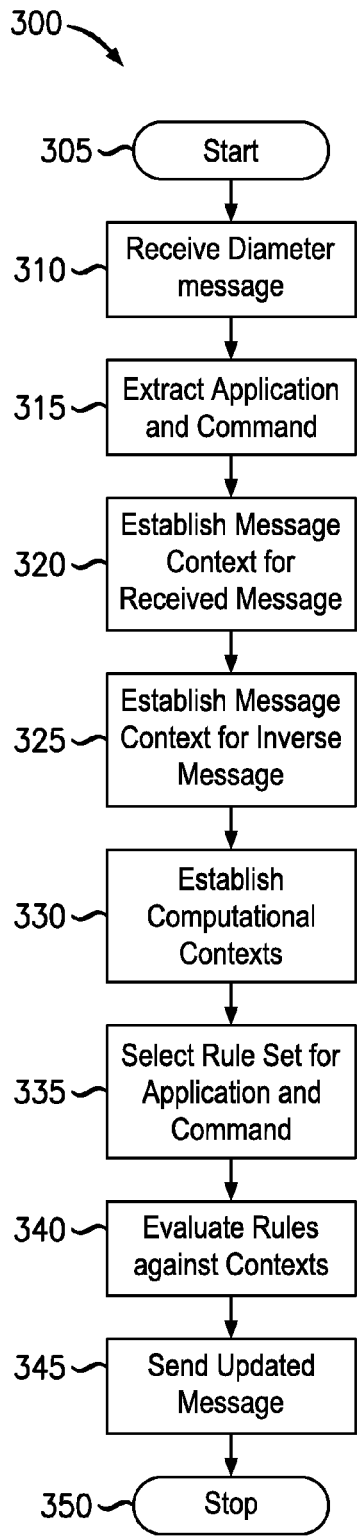
FIG. 3 illustrates an exemplary method for processing Diameter messages.

FIG. 3 illustrates an exemplary method 300 for processing Diameter messages. Method 300 may be performed by the components of DRA 200 such as, for example, Diameter stack 205, message handler 210, rule engine 215, or context creator 230.

Method 300 may begin in step 305 and proceed to step 310 where the DRA 200 may receive a Diameter message to be processed. Next, in step 315, the DRA 200 may extract a message type from the received Diameter message. In various embodiments, the message type may be defined by the application and command type of the message. Then, in step 320, the DRA may use the extracted message type to establish a message context object to wrap the received Diameter message. In a similar manner, the DRA 200 may establish a message context object for an inverse of the Diameter message in step 325. For example, the DRA 200 may use a lookup table to identify the inverse message type of the extracted message type and request a new message context based on the inverse message type.

The DRA 200 may then, in step 330, proceed to establish any other computational context objects for which the DRA 200 stores a context artifact or which the rule engine may request. For example, the DRA 200 may establish a routing decision context object and a subscriber record context object. After the appropriate context objects have been at least instantiated, method 300 may proceed to step 335 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 340. The individual rules may include references to various components of the context objects, herein referred to as "context object references." Such components may constitute attributes or actions of the context objects. To evaluate a rule including such a reference, the DRA may access the referenced component. For example, an attribute of a context object may be used in a comparison to determine whether a rule is applicable or an action of a context object may be used in applying the result of a rule. Various additional uses for a reference to a context object will be apparent. After applying the appropriate rule sets, the DRA 200 may transmit one or more messages to other devices in step 345. For example, the DRA may forward the Diameter message, which may be modified, to another device or may transmit an answer back to the device that sent the received message. Method 300 may proceed to end in step 350.

Figure 4:
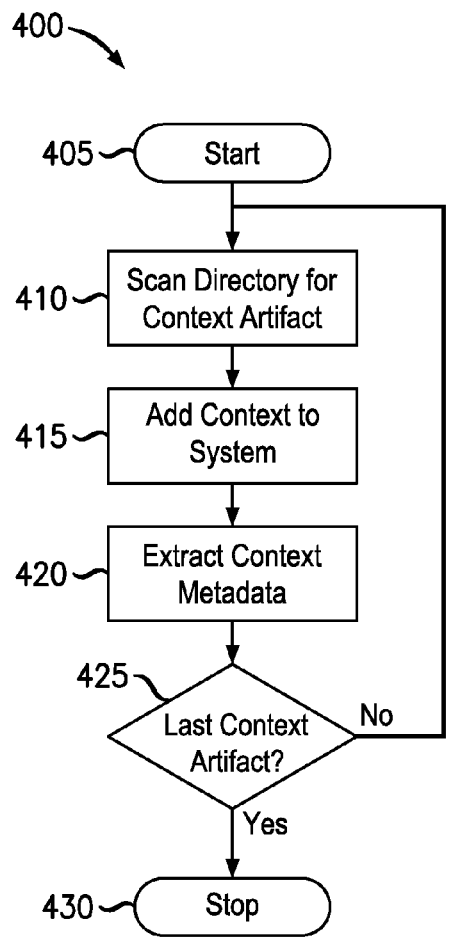
FIG. 4 illustrates an exemplary method for utilizing context artifacts.

FIG. 4 illustrates an exemplary method 400 for utilizing context artifacts. Method 400 may be performed by the components of DRA 200 such as, for example, user interface 225 or context creator 230. Method 400 may be performed, for example, upon system startup, upon request by user interface, or upon receiving a Diameter message. It will be understood that a context artifact may be used to define computational contexts as well as message contexts.

Method 400 may begin in step 405 and proceed to step 410 where the DRA may scan one or more directories for a context artifact to process. In various embodiments, the DRA may process all context artifacts located on a storage device or in a particular directory or may only process context artifacts specified in a list of artifacts to be processed. After locating a context artifact, method 400 may proceed to step 415, where the DRA may add a context object type to the system for use by a rule engine, a user interface, or a context creator. In various embodiments, such as embodiments wherein the context artifacts define one or more Java classes, step 415 may include interpreting the context artifact to enable instantiation of context objects having the context object type defined by the class. Various other methods for utilizing a context artifact to enable the use of new context object types will be apparent.

Next, in step 420, the DRA may extract any metadata for the context object type for the context object. For example, as will be explained in greater detail below with respect to FIG. 5, a context artifact may include annotations or tags that specify a user-friendly name for the context object type, attributes, or actions. The DRA may store this metadata for use by a user interface or rule engine. Next, in step 425, the DRA may determine whether additional context artifacts remain to be processed. If additional context artifacts remain, method 400 may loop back to step 410. Otherwise, method 400 may proceed to end in step 430.

As noted above, a context artifact may include annotations or tags specifying various metadata for use by the DRA. For example, a context artifact for a context object "Floober" may read, in part:

```
import
com.alcatel.tpapps.ddm.common.sourcecontexts.DDMContextBase;
...
@DDMContext(localizedName = "Floober")
public class FlooberContext extends DDMContextBase
{
    ...
    @DDMRuleAttribute(name = "Floober-Attribute")
    public String getFlooberValue ( )
    {
        String aString;
        //Do stuff.
        ...
        return aString;
    }
    ...
    @DDMRuleAttribute(name = "Floober-Action")
    public void doFloober( )
    {
        //Do stuff.
        ...
    }
    ...
}
```

In the example above, the context artifact may include three annotations. A first annotation may specify a name for the context object type ("Floober") and the other two annotations may specify names for components of the context object ("Floober-Attribute" and "Floober-Action"). Using this metadata, a user interface may enable a user to construct rules including references to the functions getFlooberValue( ) and doFloober( ). Such references may be, for example, "Floober.Floober-Attribute" and "Floober.Floober-Action," respectively.

Figure 5:
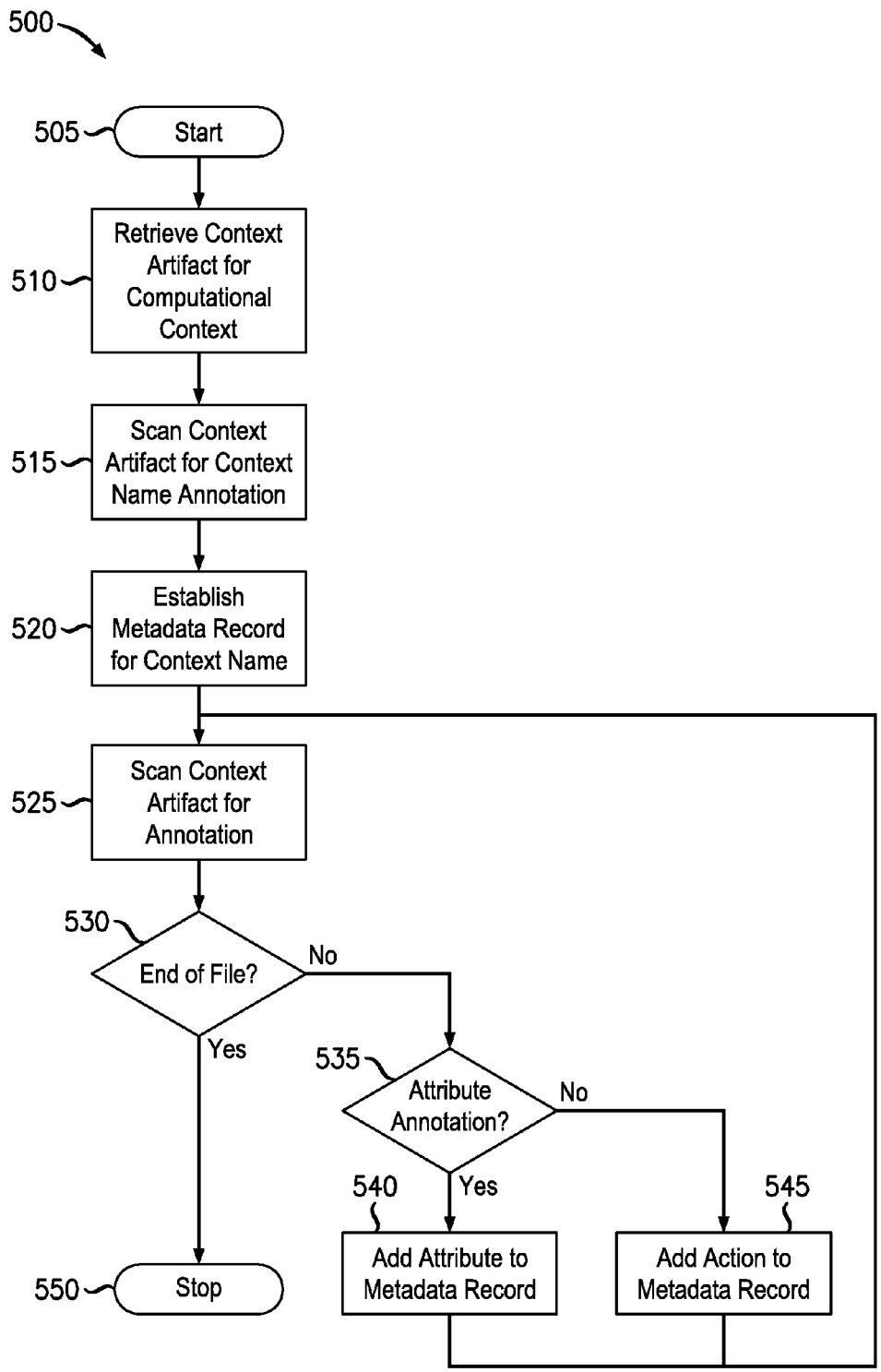
FIG. 5 illustrates an exemplary method for generating metadata for a context object.

FIG. 5 illustrates an exemplary method 500 for generating metadata for a context object. Method 500 may be performed by the components of DRA 200 such as user interface 225 or context creator 230. Method 500 may be performed at various times such as, for example, during system start up, upon request by a user interface, or upon request by a rule engine. In some embodiments, method 500 may correspond to step 420 of method 400 or may be performed along with step 330 of method 300.

Method 500 may begin in step 505 and proceed to step 510 where the DRA may retrieve a context artifact to process. This may involve retrieving an artifact from an artifact storage or simply identifying the artifact already retrieved in another method such as method 400. Next, in step 515, the DRA may scan the context artifact for a context name annotation. For example, the DRA may tokenize or otherwise parse the artifact to locate an annotation including the string "DDMContext," "localizedName," or another annotation. After locating the annotation, the DRA may, in step 520, establish a new metadata record including the name associated with the annotation. In the example above, the DRA may establish a metadata record for the name "Floober." The DRA may also associate the metadata record with the context object type defined by the artifact.

Next, in step 525, the DRA may scan the context artifact for an additional annotation. In various embodiments, the DRA may tokenize or otherwise parse the artifact to locate an annotation including the string "DDM," "DDMRuleAttribute," or another annotation. After attempting to locate such an attribute, the DRA may determine in step 530 whether the end of the artifact has been reached. If the DRA has reached the end of the file, method 500 may proceed to end in step 550. Otherwise, method 500 may proceed to step 535.

In step 535, the DRA may determine whether the annotation corresponds to an attribute or an action of a context object. In various embodiments, the annotation itself may specify whether the annotation applies to an attribute or action. In other embodiments, the DRA may evaluate the following function or variable to make this determination. For example, the DRA may determine that if the following function returns a value, then the annotation may correspond to an attribute. As another example, the DRA may determine that if the following function does not return any value, then the annotation may correspond to an action. If the annotation corresponds to an attribute, the DRA may, in step 540, add a new attribute to the metadata record associated with the appropriate class function. In the example above, the DRA may add the attribute name "Floober-Attribute" to the metadata record in association with the function getFlooberValue( ). If the annotation corresponds to an action, the DRA may, in step 540, add a new action to the metadata record associated with the appropriate class function. In the example above, the DRA may add the action name "Floober-Action" to the metadata record in association with the function doFloober( ). Method 500 may proceed to continue analyzing the artifact for additional annotations by looping from either step 540 or 545 back to step 525.

As noted above, context artifacts may be used to define computational contexts such as a "load balancer context object." For example, to define load balancer context object, a context artifact may read, in part:

```
import
com.alcatel.tpapps.ddm.common.sourcecontexts.DDMContextBase;
...
@DDMContext(localizedName = "Load Balancer")
public class loadBalancer Context extends DDMContextBase
{
    @DDMRuleAttribute(name = "ChooseDestination";
    parameters = zero)
    @DDMRuleAttribute(name =
    "ChooseDestinationFromPool"; parameters = one)
    public void chooseDest (string poolName = null)
    {
        if (poolName = = null)
        {
            //select best match pool
        } else {
            //locate named pool
        }
        //select pool host
        //modify message
    }
    ...
}
```

As shown above, the metadata tags in a context artifact may optionally specify whether the rule engine should accept any parameters for the attribute or action. Upon invoking the associated function, the rule engine may pass in any parameters specified in the rule. Further, the same function may be associated with multiple sets of metadata. In the example shown above, a rule may invoke "Load Balancer.ChooseDestinationFromPool Name" to correspond to an invocation of "chooseDest (Name)." Alternatively, the rule may invoke "Load Balancer.ChooseDestination" to corresponse to an invocation of "chooseDest ( )" and thereby rely on the default value for the poolName parameter, "null." It will be apparent that various other implementations are possible. For example, two different functions may actually be defined to correspond to the "ChooseDestinationFromPool" and "ChooseDestination" actions. In such an embodiment, one such function may invoke the other.

FIG. 6 illustrates an exemplary data arrangement 600 for storing load balancing pools. The data arrangement 600 may reflect some of the contents of the load balancing configuration storage 250 of the DRA 200. The data arrangement 600 may include multiple fields, including a name field 605, a description field 610, a destination realms field 615, an applications field 620, a balancing algorithm field 625, and a hosts field 630.

The name field 605 may store a name for each load balancing pool defined in the data arrangement 600. This name may be used by the rule engine 215 when invoking the load balancer functions to specify which load balancing pool is to be used when identifying a pool host to receive a forwarded message. The description field 610 may include a short textual description or other string. This string may be provided by a user for any purpose and, in some embodiments, may not be interpreted or used by the system in any regards other than presentation via the user interface 225.

The destination realms field 615 and applications field 620 may together help determine which load balancing pools apply to which received messages. For example, when a rule invokes the load balancer without specifying a desired load balancing pool by name, the rule engine 215 may locate the load balancing pool having destination realms and applications that most closely match the destination realm and application of the Diameter message being processed. The destination realms field 615 may include an indication as to which destination realms originally carried by a received Diameter message a load balancing pool applies. Likewise, the applications field 620 may include an indication as to which applications a load balancing pool applies.

The balancing algorithm field 625 may include an indication of which balancing algorithm should be applied when selecting a pool host for a message being processed. As is shown here, the DRA 200 may support two balancing algorithms: round robin and weighted distribution. Various alternative or additional balancing algorithms will be apparent.

The hosts field 630 may store an identification of one or more "pool hosts" that make up the load balancing pool. These pool hosts correspond to the downstream devices that may be selected when identifying a destination according to a respective load balancing pool. In various embodiments, the hosts field 630 may store simple identifiers for pool hosts that correspond to respective pool host records stored elsewhere. Alternatively, the hosts field 630 may store additional information related to each pool host such as, for example, an administrative state, host address, realm address, and weight.

As an example, load balancing pool record 640 may define a load balancing pool named "US LBP1." This load balancing pool 640 may apply to Diameter messages having a destination ream of "US_Public_Realm" and an application among the Gx, Gxx, and Rx applications. The load balancing pool 650 may use a round robin balancing algorithm to select a host from among hosts "H1," "H2," "H3," and "H4."

As another example, load balancing pool record 650 may define a load balancing pool named "US LBP2" that is also applicable to Diameter messages having a destination ream of "US_Public_Realm" but is applicable to all applications, as indicated by the use of the wildcard character "*." The load balancing pool 650 may use the round robin algorithm to select between the hosts "H2," "H5," and "H6." As will be apparent, pool hosts may belong to multiple load balancing pools, as is the case of pool host "H2" in this example. In various embodiments, application of a load balancing algorithm to a pool host as a member of one pool may not be affected by any applications of the load balancing algorithm applied to the pool host as a member of another pool. For example, if pool host H2 is next in line for the round robin algorithm of US LBP2, this result will not be affected by the possibility that the pool host H2 was selected on the previous selection according to US LBP1. In various alternative embodiments, the selection of a pool according to one load balancing pool will have an effect on the application of the other load balancing pool. For example, US LBP1 may skip pool host H2 if pool host H2 was recently selected by US LBP2.

As another example, load balancing pool record 660 may define a pool named "France Pool" that has a wildcard value set for both the destination realms field 615 and the applications field 620. This load balancing pool 660 may employ a weighted distribution balancing algorithm and may include only a single host, "R1." As such, when the load balancing pool 660 is selected, the selected pool host may always be pool host "R2."

As yet another example, load balancing pool record 670 may define a pool named "Germany Pool" that has a wildcard value set for both the destination realms field 615 and the applications field 620. This load balancing pool 670 may employ a weighted distribution balancing algorithm and may include two pool hosts, "R2" and "R3." The data arrangement may include numerous additional load balancing pool records 680.

FIG. 7 illustrates an exemplary data arrangement for storing pool host definitions. The data arrangement 700 may reflect some of the contents of the load balancing configuration storage 250 of the DRA 200. The data arrangement 700 may include multiple fields, including a pool host name field 705, an administrative state field 710, a host field 715, a realm field 720, and a weight field 725

The pool host name field 705 may store a name for each respective pool host. This pool host name may be used in data arrangement 600 to refer to the pool hosts defined in the data arrangement 700. The administrative state field 710 may store an indication as to whether each pool host is enabled or disabled. When applying a load balancing algorithm, the DRA 200 may consider only pool hosts having an enabled administrative state, thereby ignoring any disabled pool hosts.

The host field 715 and realm field 720 may together define an address for each pool host. Specifically, each pool host may be associated with a host name and a realm name, as is known according to, for example, the Diameter protocol. The weight field 725 may store a weight value for use by the various balancing algorithms. Generally, this value may correspond to the relative processing capabilities of each pool host, but may take on different specific meaning depending on the balancing algorithm being applied. For example, for the round robin algorithm, the weight may indicate how many requests should be sent to the pool host each time the pool host is the "current pool host" for the algorithm. As another example, for the weighted algorithm, the weight may indicate the width of the "slot" associated with the pool host, against which a randomly generated number will be compared to determine whether the pool host will receive a current Diameter message.

It will be understood that, in various embodiments, the fields 705-725 of the data arrangement 700 may instead constitute part of the hosts field 630 of data arrangement 600. In such embodiments, the values for each pool host may vary between load balancing pools. For example, pool host "H2" may have a different weight in US LBP1 than in US LBP2. Further, in various embodiments, multiple records within data arrangement may be associated with the same device (e.g., multiple records may include the same values for the host field 715 and the realm field 720). Such an arrangement may enable the same device to be given different weights or different administrative states within different load balancing pools.

As an example, pool host record 730 may define a pool host named "H1" that is currently enabled. The pool host 730 may have an address of Host A.US Private Realm 1 and a weight of 5. Similarly, pool host record 735 may define a pool host named "H2" at Host B.US Private Realm 1 having a weight of 20. Pool host 735, however, may be disabled and, as such, may be ignored by the load balancing pools US LBP1 and US LBP2 when selecting a pool host for receiving a Diameter message.

As is illustrated by pool host records 730-755 and load balancing pool records 640, 650, the pool hosts belonging to a specific load balancing pool need not belong to the same realm. As shown, pool hosts "H3," "H4," and "H5" are located in "US Private Realm 2" while pool hosts "H1," "H2," and "H6" are located in "US Private Realm 1." Nevertheless, load balancing pools US LBP1 and US LBP2 both include a mix of these pool hosts that spans the two realms.

In various embodiments, pool hosts may be defined to enable realm routing. In such definitions, the host field 715 may include a "nonvalue" rather than a host name. For example, the host field 715 may be blank, include a null value, or any other value that is not a valid host name and recognizable as such. Upon selection of such a pool host, the DRA 200 may insert the appropriate destination realm into the Diameter message and any other information to effect the forwarding of the Diameter message to some intermediate device belonging to the selected realm, such as another DRA or a Diameter Proxy Agent, for further refinement of the destination address. For example, each of the pool host records 760-770 includes the nonvalue "null" in their respective host fields 715. As such, if pool host "R1" were selected, the Diameter message would be routed toward an intermediate node belonging to France Private Realm. Likewise, if pool host "R2" or "R3" were selected, the Diameter message would be routed toward an intermediate node belonging to Germany Private Realm 1 or Germany Private Realm 2, respectively. The data arrangement 700 may include additional pool host records 775.

As described above, the user interface 225 may provide an interface for the user to modify the data stored in the data arrangements 600 and 700. For example, the user interface 225 may enable a user to add, modify, and delete load balancing pools and pool hosts. This configuration information may then affect the resolution of the various rules that invoke the load balancer.

Figure 8:
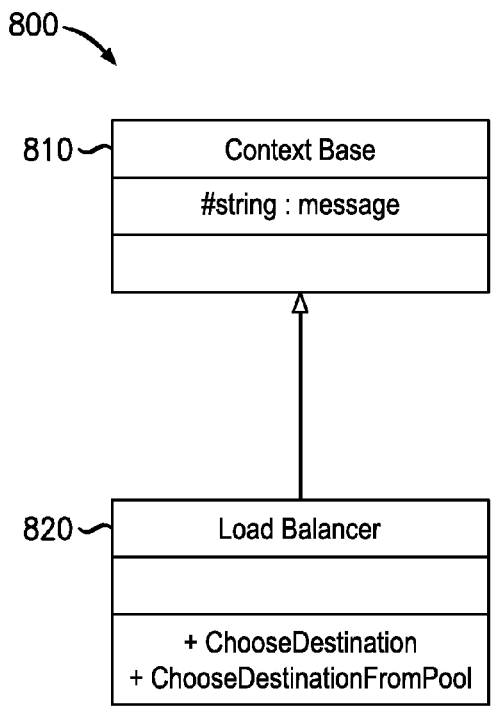
FIG. 8 illustrates an exemplary class diagram for a load balancer context object.

FIG. 8 illustrates an exemplary class diagram 800 for a load balancer context object. Class diagram 800 may represent a context object based on the load balancer context object type defined in the exemplary context artifact above. Components associated with a component name as specified by annotations in the context artifact may be represented by such component names.

As shown, the load balancer context object 820 may extend a context base class 810. The context base class may include basic context object functionality. For example, the context base class 810 may include a protected string variable for storing the received Diameter message. Additionally or alternatively, the context base class 810 may provide one or more functions for interfacing with an API of the Diameter stack to read or manipulate the received Diameter message or other Diameter messages. Various additional or alternative attributes and actions suitable for provision in a context base class will be apparent.

The load balancer context object 820 may extend the context base class 810 by adding one or more attributes or actions. For example, load balancer context object 820 may add two actions for use by the user interface or rule engine: the "ChooseDestination" and the "ChooseDestinationFromPool" actions. As will be explained in greater detail below, these actions may both locate an appropriate load balancing pool, select a pool host, and modify the current Diameter message based on the selected pool host. As explained above, the "ChooseDestinationFromPool" action may allow the specification of the appropriate load balancing pool by name, while the "ChooseDestination" action may locate the load balancing pool that best matches the received Diameter message.

As will be understood, the functionality of the load balancer context object 820 may be implemented in a context object other than a dedicated load balancer context object. For example, the actions "ChooseDestination" and "ChooseDestinationFromPool" may be included in a received message context object or in a system context object. Various modification for effecting such alternative embodiments will be apparent.

Figure 9:
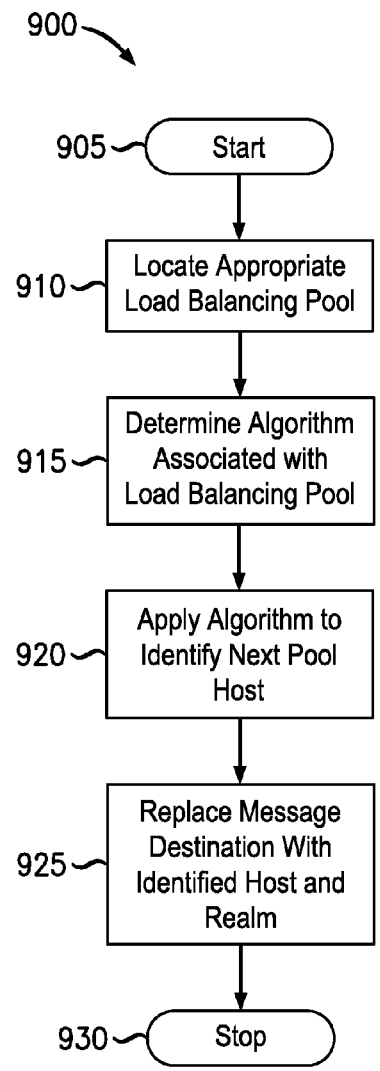
FIG. 9 illustrates an exemplary method for choosing a destination for a message being processed.

FIG. 9 illustrates an exemplary method 900 for choosing a destination for a message being processed. The method 900 may correspond to the "ChooseDestination" or "ChooseDestinationFromPool" action of the load balancer context object 820. The method 900 may be performed by the components of a DRA such as, for example, context creator 230.

The method 900 may begin in step 905 and proceed to step 910 where the DRA 200 may locate an appropriate load balancing pool. For example, if a load balancing pool name was provided, the DRA 200 may locate the load balancing pool associated with the provided name. Otherwise, the DRA may locate the load balancing pool that most closely matches the received message.

Next, in step 915, the DRA 200 may determine the balancing algorithm that is associated with the load balancing pool identified in step 915. For example, the DRA 200 may read a balancing algorithm field of the record that defines the load balancing pool. If the DRA 200 only allows for a single balancing algorithm, the DRA 200 may skip step 915 as the applied algorithm will always be the same in such embodiments.

In step 920, the DRA 200 may apply the balancing algorithm to the load balancing pool to identify the next pool host to receive a message. For example, the DRA 200 may utilize a round robin or weighted distribution algorithm, as is appropriate to the identified load balancing pool, to identify an active pool host to receive the current Diameter message.

After identifying the pool host that is to receive the Diameter message, the DRA 200 may, in step 925, modify the Diameter message to include the destination host and realm of the selected pool host. In the case of a pool host that corresponds generally to a realm (e.g., a pool host that includes a nonvalue for a host name), the DRA 200 may insert the destination realm and any appropriate destination host value into the Diameter message to effect the desired realm routing when the Diameter message is eventually forwarded. The method 900 may then proceed to end in step 930.

Figure 10:
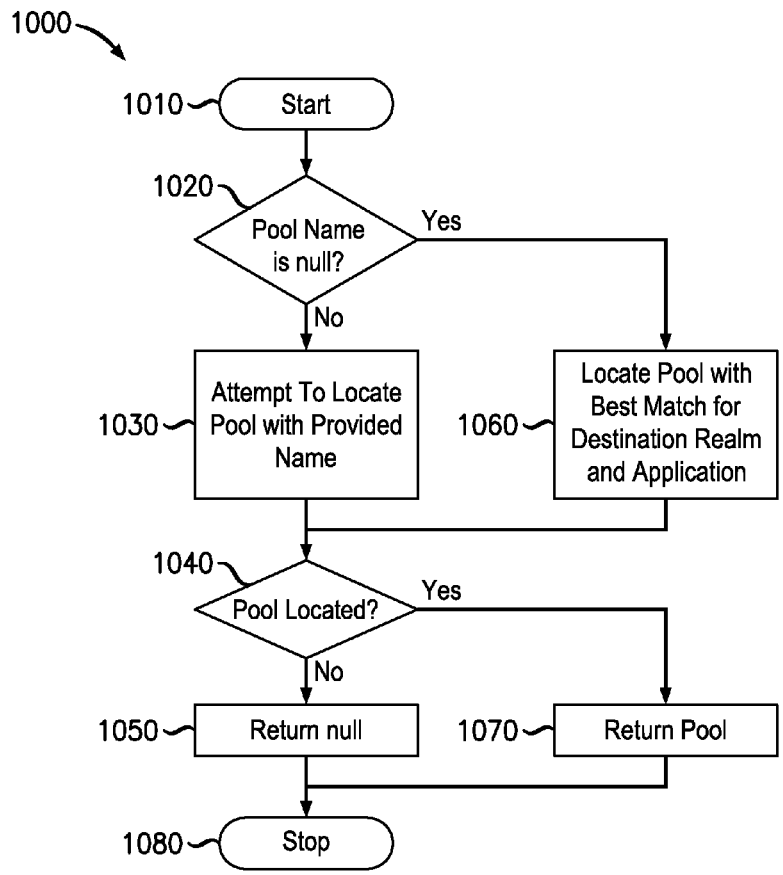
FIG. 10 illustrates an exemplary method for locating an appropriate load balancing pool.

FIG. 10 illustrates an exemplary method 1000 for locating an appropriate load balancing pool. The method 1000 may correspond, in some embodiments, to step 910 of exemplary method 900. The method 900 may be performed by the components of a DRA such as, for example, context creator 230.

The method may begin in step 1010 and proceed to step 1020 where the DRA 200 may determine whether a pool name has been provided. If a pool name has been provided (e.g., if the pool name parameter is not null), the method 1020 may proceed to step 1030 where the DRA 200 may attempt to locate a load balancing pool associated with the provided name. In some embodiments, step 1030 may only locate a load balancing pool having the exact name specified. In other embodiments, step 1030 may locate a load balancing pool having the name that most closely matches the provided name. For example, a provided name of "France" may be determined at step 1030 to most closely match the load balancing pool "France Pool" as defined by load balancing pool record 660.

In step 1040, the DRA 200 may determine whether any pool was located in step 1030. If no appropriate pool is located, then the method 1000 may return a "null" value in step 1050 and proceed to end in step 1080. The returned "null" value may prompt the DRA 200 to skip any remaining steps in method 900 and thereby effect no modification to the Diameter message being processed.

If, on the other hand, an applicable pool was located in step 1030, the method 1000 may proceed to from step 1040 to step 1070 where the method 1000 returns the located pool. The method 1000 may then proceed to end in step 1080.

If, at step 1020, the DRA 200 determines that no pool name has been provided, the method 1000 may proceed to step 1060. Further, in various embodiments, when no pool is located in step 1030, the method 1000 may proceed from step 1040 to step 1060, instead of to step 1050. In other words, in some embodiments, where a pool name is provided but cannot be located, the method 1000 may revert to processing as if no pool name were provided.

In step 1060, the DRA 200 may attempt to locate a load balancing pool that most closely matches the Diameter message. For example, the DRA 200 may determine a destination realm and application associated with the Diameter message and determine which load balancing pool has the closest match for these values. In various embodiments, the "closest match" may be determined based on a priority scheme which, in some embodiments, may be configurable via the user interface 225. An exemplary priority scheme may select a closest match as follows:

1) A Load Balancing Pool that has the exact same destination realm as the request and the exact same application as the request
2a) A Load Balancing Pool that has the destination realm of the request in its list of destination realms and the exact same application as the request
2b) A Load Balancing Pool that has the exact same destination realm as the request and the application of the request in its list of applications
3) A Load Balancing Pool that has the destination realm of the request in its list of destination realms and the application of the request in its list of applications
4a) A Load Balancing Pool that has a wildcard for the destination realm and the exact same application as the request 4b) A Load Balancing Pool that has the exact same destination realm as the request and a wildcard for the application 5) A Load Balancing Pool that has a wildcard for the destination realm and a wildcard for the application Various additional or alternative priority items or orderings will be apparent. After attempting to locate a best match load balancing pool, method 1000 may proceed to step 1040.

Figure 11:
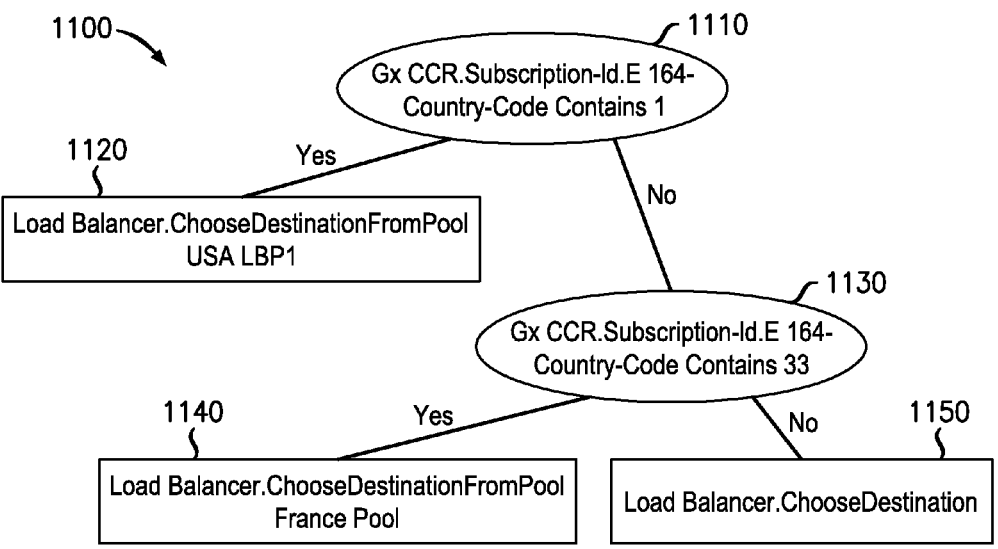
FIG. 11 illustrates an exemplary rule set.

FIG. 11 illustrates an exemplary rule set 1100. Rule set 1100 may be stored in a rule storage such as rule storage 220 of DRA 200. In various embodiments, rule set 1100 may be stored as a binary decision tree, as illustrated. It will be apparent that various alternative arrangements may be used for storing a rule set. For example, rule set 1100 may be stored as a plurality of records that each include a criteria field for evaluation to determine whether a rule is applicable and a result field storing an action to be taken when the rule is applicable. Further, rule set 1100 may be stored as, for example, a table in a database stored in rule storage 220. Alternatively, rule set 1100 could be a series of linked lists, an array, or a similar data structure. Thus, it should be apparent that rule set 1100 may be an abstraction of the underlying data; any data structure suitable for storage of this data may be used.

Rule set 1100 may be applicable to Gx CCR Diameter messages. Rule set 1100 may have been generated based on user-provided pseudo-code such as the above example. A DRA may store separate message type-specific rule sets (not shown) for a number of different message types. Rule set 1100 may include criteria nodes such as criteria nodes 1110, 1130 and result nodes such as result nodes 1120, 1140, 1150. It will be apparent that rule set 1100 is exemplary and that various embodiments may include rule sets (not shown) that are more complex than the rule set 1100 as illustrated.

Criteria nodes may present a condition to be evaluated by a rule engine. Based on the evaluation, the rule engine may select another criteria node or a result node to evaluate. As an example, criteria node 1110 may store the condition "Gx CCR.Subscription-Id.E164-Country-Code Contains 1." Upon evaluation of criteria node 1110, a rule engine may determine whether the condition is true or false. For example, the rule engine may read a "Subscription-Id.E164-Country-Code" attribute from a Gx CCR context object and determine whether the attribute contains the value "1". If the comparison returns true, the rule engine may move on to evaluate result node 1120. Otherwise, the rule engine may move on the evaluate criteria node 1130.

Result nodes may present one or more actions to be performed by a rule engine. Such actions may include, for example, modifying a Diameter message or transmitting a Diameter message to a particular device. As an example, result node 1120 may indicate that the rule engine should access the action Load Balancer.ChooseDestinationFromPool and pass in the parameter value "USA LBP1." Upon encountering this instruction, the DRA 200 may execute method 900 to select a destination for the message and subsequently modify the message for transmission to the selected destination.

Criteria node 1130 may include a condition that has a further check against the "Subscription-Id.E164-Country-Code" attribute, this time determining whether the attribute contains the value "33." If so, the rule engine may move on to evaluate result node 1140. Otherwise, the rule engine may move on to evaluate result node 1150.

Result node 1140 may include an instruction to access the Load Balancer.ChooseDestinationFromPool action, but this time may specify a different LoadBalancingPool: "France Pool." Thus, the selection of the downstream node to receive the message will be affected by the load balancing pool specified by the rule. The result node 1150 may not specify a load balancing pool by name and, instead, invoke the Load Balancer.ChooseDestination action. As such, the result node 1150 may leave selection of an appropriate load balancing pool up to the determination of a "closest matching" pool for the received Diameter message.

According to the foregoing, various embodiments enable robust and dynamic handling of various Diameter messages at a diameter routing agent. In particular, by generating computational context objects based on context artifacts, a DRA may facilitate a user in specifying complex behaviors to be followed in processing various Diameter messages. For example, a user may specify that load balancing should be performed with respect to received messages. Further, the user may define different load balancing behaviors and destinations that are to be used in different situations.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:

receiving a Diameter message at the DRA from an origin device;

locating, based on an instruction to perform load balancing, an applicable load balancing pool of a plurality of load balancing pools for the Diameter message;

identifying a pool host from the applicable load balancing pool to receive the Diameter message;
modifying a destination address of the Diameter message to include an address of the identified pool host; and
transmitting the Diameter message based on the modified destination address.

2. The method of claim 1, wherein: the instruction to perform load balancing includes a name of a load balancing pool; and locating an applicable load balancing pool comprises
locating a load balancing pool associated with the name.

3. The method of claim 1, wherein: the plurality of load balancing pools are associated with respective values for a destination realm attribute and respective values for an application attribute; and locating an applicable load balancing pool comprises:
identifying a destination realm and an application associated with the Diameter request; and
locating a load balancing pool having values for the destination realm attribute and the application attribute that most closely matches the destination realm and the application associated with the Diameter request.

4. The method of claim 3, wherein: a first load balancing pool of the plurality of load balancing pools is associated with: a value for the destination realm attribute that exactly matches the destination realm of the Diameter request, and a value for the application attribute that exactly matches the application of the Diameter request; a second load balancing pool of the plurality of load balancing pools is associated with: a value for the destination realm attribute that includes the destination realm of the Diameter request and at least one additional destination realm, and a value for the application attribute that exactly matches the application of the Diameter request; a third load balancing pool of the plurality of load balancing pools is associated with: a value for the destination realm attribute that exactly matches the destination realm of the Diameter request, and a value for the application attribute that includes the application of the Diameter request and at least one additional application; and locating a load balancing pool comprises
determining that the first load balancing pool more closely matches the Diameter request than the second load balancing pool and the third load balancing pool.

5. The method of claim 1, wherein: the applicable load balancing pool identifies a balancing algorithm and a plurality of pool hosts; and identifying a pool host from the applicable load balancing pool to receive the Diameter message comprises:
determining the balancing algorithm identified by the load balancing pool, and
applying the balancing algorithm to the plurality of pool hosts to identify the pool host.

6. The method of claim 5, wherein applying the balancing algorithm utilizes a plurality of weights respectively associated with the plurality of pool hosts.

7. The method of claim 1, wherein the destination address of the identified pool host includes a value for a destination realm attribute and a nonvalue for a destination host attribute.

8. The method of claim 1, further comprising
evaluating a rule of a plurality of externalized rules, wherein the rule includes the instruction to perform load balancing.

9. A Diameter Routing Agent (DRA) for processing a Diameter message, the DRA comprising:
a rule storage configured to store a rule that includes an instruction to perform load balancing;
a Diameter stack configured to receive a Diameter message;
a rule engine configured to: evaluate the rule, locate, based on the instruction to perform load balancing, an applicable load balancing pool of a plurality of load balancing pools for the Diameter message, identify a pool host from the applicable load balancing pool to receive the Diameter message, and modify a destination address of the Diameter message to include an address of the identified pool host; and
a message handler configured to transmit, via the Diameter stack, the Diameter message based on the modified destination address.

10. The DRA of claim 9, wherein: the instruction to perform load balancing includes a name of a load balancing pool; and in locating an applicable load balancing pool, the rule engine is configured to locate a load balancing pool associated with the name.

11. The DRA of claim 9, wherein: the plurality of load balancing pools are associated with respective values for a destination realm attribute and respective values for an application attribute; and in locating an applicable load balancing pool, the rule engine is configured to: identify a destination realm and an application associated with the Diameter request; and locate a load balancing pool having values for the destination realm attribute and the application attribute that most closely matches the destination realm and the application associated with the Diameter request.

12. The DRA of claim 11, wherein: a first load balancing pool of the plurality of load balancing pools is associated with: a value for the destination realm attribute that exactly matches the destination realm of the Diameter request, and a value for the application attribute that exactly matches the application of the Diameter request; a second load balancing pool of the plurality of load balancing pools is associated with: a value for the destination realm attribute that includes the destination realm of the Diameter request and at least one additional destination realm, and a value for the application attribute that exactly matches the application of the Diameter request; a third load balancing pool of the plurality of load balancing pools is associated with: a value for the destination realm attribute that exactly matches the destination realm of the Diameter request, and a value for the application attribute that includes the application of the Diameter request and at least one additional application; and in locating a load balancing pool, the rule engine is configured to determine that the first load balancing pool more closely matches the Diameter request than the second load balancing pool and the third load balancing pool.

13. The DRA of claim 9, wherein: the applicable load balancing pool identifies a balancing algorithm and a plurality of pool hosts; and in identifying a pool host from the applicable load balancing pool to receive the Diameter message, the rule engine is configured to: determine the balancing algorithm identified by the load balancing pool, and apply the balancing algorithm to the plurality of pool hosts to identify the pool host.

14. The DRA of claim 13, wherein applying the balancing algorithm utilizes a plurality of weights respectively associated with the plurality of pool hosts.

15. The DRA of claim 9, wherein the destination address of the identified pool host includes a value for a destination realm attribute and a nonvalue for a destination host attribute.

16. A non-transitory machine-readable storage medium encoded with instructions for execution by a Diameter Routing Agent (DRA) for processing a Diameter message, the medium comprising:
- instructions for receiving a Diameter message at the DRA from an origin device;
- instructions for locating, based on an instruction to perform load balancing, an applicable load balancing pool of a plurality of load balancing pools for the Diameter message;
- instructions for identifying a pool host from the applicable load balancing pool to receive the Diameter message;
- instructions for modifying a destination address of the Diameter message to include an address of the identified pool host; and
- instructions for transmitting the Diameter message based on the modified destination address.

17. The non-transitory machine-readable storage medium of clam 16, wherein: the instruction to perform load balancing includes a name of a load balancing pool; and the instructions for locating an applicable load balancing pool comprise
- instructions for locating a load balancing pool associated with the name.

18. The non-transitory machine-readable storage medium of claim 16, wherein: the plurality of load balancing pools are associated with respective values for a destination realm attribute and respective values for an application attribute; and the instructions for locating an applicable load balancing pool comprise:
- instructions for identifying a destination realm and an application associated with the Diameter request; and
- instructions for locating a load balancing pool having values for the destination realm attribute and the application attribute that most closely matches the destination realm and the application associated with the Diameter request.

19. The non-transitory machine-readable storage medium of claim 16, wherein: the applicable load balancing pool identifies a balancing algorithm and a plurality of pool hosts; and the instructions for identifying a pool host from the applicable load balancing pool to receive the Diameter message comprise:
- instructions for determining the balancing algorithm identified by the load balancing pool, and
- instructions for applying the balancing algorithm to the plurality of pool hosts to identify the pool host.

20. The non-transitory machine-readable storage medium of claim 16, further comprising instructions for evaluating a rule of a plurality of externalized rules, wherein the rule includes the instruction to perform load balancing.

* * * * *